United States Patent
Panging

(10) Patent No.: US 9,461,987 B2
(45) Date of Patent: Oct. 4, 2016

(54) AUDIO AUTHENTICATION SYSTEM

(71) Applicant: Bank of America Corporation, Charlotte, NC (US)

(72) Inventor: Pankaj Panging, Frisco, TX (US)

(73) Assignee: Bank of America Corporation, Charlotte, NC (US)

( * ) Notice: Subject to any disclaimer, the term of this patent is extended or adjusted under 35 U.S.C. 154(b) by 267 days.

(21) Appl. No.: 14/459,863

(22) Filed: Aug. 14, 2014

(65) Prior Publication Data
US 2016/0050197 A1  Feb. 18, 2016

(51) Int. Cl.
| | |
|---|---|
| H04L 29/06 | (2006.01) |
| G06F 3/16 | (2006.01) |
| G06F 21/32 | (2013.01) |
| G06F 21/83 | (2013.01) |
| G06F 21/42 | (2013.01) |

(52) U.S. Cl.
CPC ............. *H04L 63/083* (2013.01); *G06F 21/32* (2013.01); *G06F 21/83* (2013.01); *G06F 21/42* (2013.01); *G06F 2221/2141* (2013.01); *G06F 2221/2151* (2013.01)

(58) Field of Classification Search
CPC ..... H04L 63/083; G06F 21/83; G06F 21/32; G06F 21/42
See application file for complete search history.

(56) References Cited

U.S. PATENT DOCUMENTS

| | | | | |
|---|---|---|---|---|
| 8,898,064 B1* | 11/2014 | Thomas | ................ | G06F 21/32 704/270 |
| 2009/0141875 A1* | 6/2009 | Demmitt | ............ | H04M 3/4878 379/88.14 |
| 2012/0167202 A1* | 6/2012 | Kim | ........................ | G06F 21/42 726/19 |
| 2013/0132091 A1* | 5/2013 | Skerpac | ................ | G10L 17/005 704/273 |
| 2014/0109211 A1* | 4/2014 | Suzuki | .................... | G06F 21/35 726/7 |

(Continued)

OTHER PUBLICATIONS

Mohammad Shirali-Shahreza et al. "A New Solution for Password Key Transferring in Steganography Methods by CAPTCHA through MMS Technology" International Conference on Information and Emerging Technologies (Jul. 6-7, 2007) (6 pages).*

(Continued)

*Primary Examiner* — Joseph P Hirl
*Assistant Examiner* — Thomas Gyorfi
(74) *Attorney, Agent, or Firm* — Michael A. Springs

(57) ABSTRACT

According to one embodiment, an apparatus is provided that comprises a memory, an interface, and a processor communicatively coupled to the memory and to the interface. The memory can store a conversion rule. The interface can receive an audio signal and receive a file. The file indicates a start time, an end time, a key, and a password. The processor can clip the audio signal from the start time to the end time to produce a portion of the audio signal. The processor can convert, based at least in part upon the conversion rule, the portion of the audio signal using the key to form a converted portion of the audio signal. The processor can determine that the converted portion of the audio signal matches the password. The interface can communicate a response indicating that the converted portion of the audio signal matches the password.

21 Claims, 4 Drawing Sheets

(56) References Cited

U.S. PATENT DOCUMENTS

| | | | | |
|---|---|---|---|---|
| 2014/0154969 | A1* | 6/2014 | Atsmon | G06F 21/34 455/3.06 |
| 2014/0282962 | A1* | 9/2014 | Harrison | H04L 63/0838 726/7 |
| 2015/0046990 | A1* | 2/2015 | Oberheide | G06F 21/32 726/6 |
| 2015/0215299 | A1* | 7/2015 | Burch | H04L 63/08 726/5 |
| 2016/0044018 | A1* | 2/2016 | Grosskopf | H04L 63/083 726/5 |
| 2016/0162905 | A1* | 6/2016 | Singh | G06F 21/31 705/304 |

OTHER PUBLICATIONS

Jeric Ryan R. De Josef et al. "Ultrasonic Key Recognition: Security Algorithm for Pre-Composed High Frequency Sound as a Mode of Unlocking a Secuirity Lock" 2012 IEEE/ACIS 11th International COnference on Computer and Information Science (6 pages).*

Andrea Bianci et al. "Open Sesame: Design Guidelines for Invisible Passwords" Article from "Computer" magazine (vol. 45, Issue 4), Apr. 2012 (© 2012 IEEE) (pp. 58-65).*

* cited by examiner

AUDIO AUTHENTICATION SYSTEM

TECHNICAL FIELD

This disclosure relates generally to a system for performing audio authentication.

BACKGROUND

Systems may grant access to secure or sensitive information after authentication is performed. Some authentication techniques involve usernames and/or passwords. Others may involve biometric information.

SUMMARY OF THE DISCLOSURE

In accordance with the present disclosure, disadvantages and problems associated with authentication may be reduced or eliminated.

According to one embodiment, an apparatus is provided that comprises a memory, an interface, and a processor communicatively coupled to the memory and to the interface. The memory can store a conversion rule. The interface can receive an audio signal and receive a file. The file indicates a start time, an end time, a key, and a password. The processor can clip the audio signal from the start time to the end time to produce a portion of the audio signal. The processor can convert, based at least in part upon the conversion rule, the portion of the audio signal using the key to form a converted portion of the audio signal. The processor can determine that the converted portion of the audio signal matches the password. The interface can communicate a response indicating that the converted portion of the audio signal matches the password.

According to one embodiment, a method is provided that comprises the steps of storing, by a memory, a conversion rule. The method further comprises receiving, by an interface, an audio signal and receiving, by the interface, a file. The file indicates a start time, an end time, a key, and a password. The method further comprises clipping, by a processor communicatively coupled to the memory and to the interface, the audio signal from the start time to the end time to produce a portion of the audio signal. The method further comprises converting, by the processor, based at least in part upon the conversion rule, the portion of the audio signal using the key to form a converted portion of the audio signal. The method further comprises determining, by the processor, that the converted portion of the audio signal matches the password, and communicating, by the interface, a response indicating that the converted portion of the audio signal matches the password.

According to one embodiment, one or more computer-readable non-transitory storage media embodying software is provided. The software is operable when executed to store, by a memory, a conversion rule. The software is further operable when executed to receive, by an interface, an audio signal and receive, by the interface, a file. The file indicates a start time, an end time, a key, and a password. The software is further operable when executed to clip, by a processor communicatively coupled to the memory and to the interface, the audio signal from the start time to the end time to produce a portion of the audio signal. The software is further operable when executed to convert, by the processor, based at least in part upon the conversion rule, the portion of the audio signal using the key to form a converted portion of the audio signal. The software is further operable when executed to determine, by the processor, that the converted portion of the audio signal matches the password, and communicate, by the interface, a response indicating that the converted portion of the audio signal matches the password.

Technical advantages of certain embodiments of the present disclosure include more secure authentication by providing a technique for authentication that reduces the probability of an unauthorized user fraudulently accessing an account. Another technical advantage of certain embodiments of the presence disclosure include more reliable authentication by providing an authentication technique that does not degrade and/or change over time. Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Embodiments of the present invention and its advantages are best understood by referring to FIGS. 1 through 4, like numerals being used for like and corresponding parts of the various drawings.

Systems may grant access to secure and/or sensitive information after authentication is performed. Some authentication techniques involve usernames and/or passwords. For example, a user may enter a textual username and a textual password associated with that username to be granted access to the secure and/or sensitive information. However, textual passwords may be lost, forgotten and/or stolen, which jeopardizes the security of the information.

Some authentication techniques involve the user providing biometric information, such as fingerprints. For example, if the provided fingerprint matches a fingerprint associated with the account, access to the secure and/or sensitive information may be granted. However, biometric information, such as fingerprints, may change as the user ages. As a result, biometric information may become more unreliable as time passes. A system for performing audio authentication is provided which may improve the security and reliability of the authentication process.

The system may allow the user to perform authentication using an audio file such as for example, by playing a song using the user's phone and/or laptop. After the system receives the audio signal generated by playing the audio file, the system may convert that signal into a password. If that password matches the password associated with an account of the user, then access may be granted. However, if that password does not match the password associated with the account, then access may be denied.

In this manner, a user may authenticate himself by playing an audio file, such as a song, stored on the user's phone and/or laptop. This may improve security because it may be difficult to know which audio file on the phone and/or laptop is the appropriate file. Moreover, it may be difficult to steal the audio signal generated by playing the audio file. The audio authentication process will be described in more detail with respect to FIGS. 1 through 4.

Figure 1:
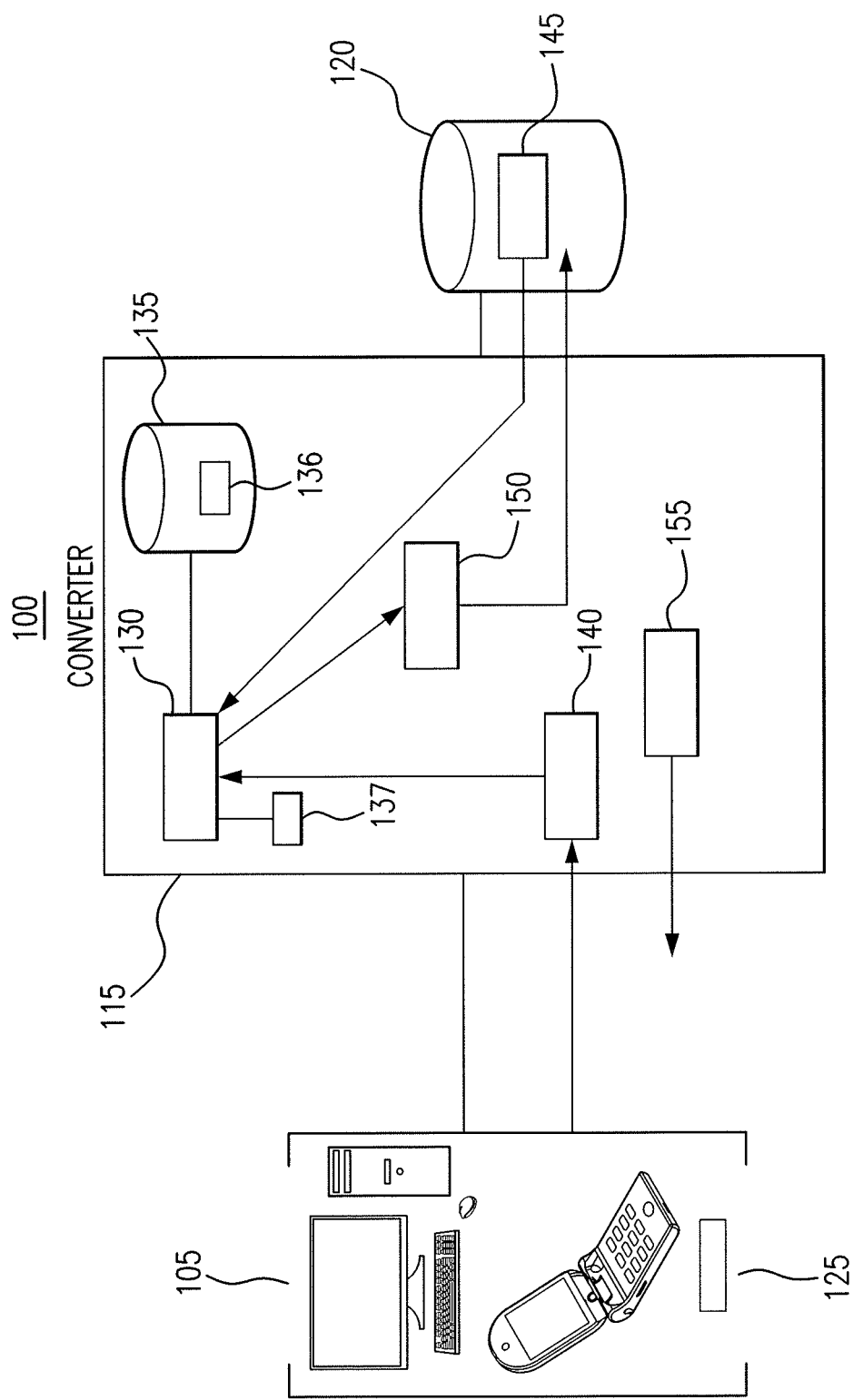
FIG. 1 is a schematic diagram of one embodiment of a system for performing audio authentication.

FIG. 1 is a schematic diagram of one embodiment of a system 100 for performing audio authentication. As illustrated in FIG. 1, system 100 includes a device 105, a converter 115, and a database 120. Device 105, converter 115, and database 120 may be communicatively coupled to each other.

System 100 may include a network that facilitates communication between components of system 100. This disclosure contemplates any suitable network operable to facilitate communication between the components of system 100. The network may include any interconnecting system capable of transmitting audio, video, signals, data, messages, or any combination of the preceding. The network may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Device 105 may initiate the audio authentication process. For example, a user may use device 105 to request access to secure or sensitive information. The user may then use device 105 to perform audio authentication to gain access to that information. Device 105 may store an audio file 125. The user may select audio file 125 and in response, device 105 may play audio file 125. For example, audio file 125 may be a song. When the user selects the song, device 105 may play the song. By playing audio file 125, device 105 may generate an audio signal that may be used to perform audio authentication.

This disclosure contemplates device 105 being any appropriate device for sending and receiving communications. As an example and not by way of limitation, device 105 may be a computer, a laptop, a wireless or cellular telephone, an electronic notebook, a personal digital assistant, a tablet, or any other device capable of receiving, processing, storing, and/or communicating information with other components of system 100. Device 105 may also include a user interface, such as a display, a microphone, keypad, a speaker, and/or other appropriate terminal equipment. In some embodiments, an application executed by device 105 may perform the functions described herein, such as for example playing audio file 125.

Converter 115 may perform audio authentication using a received audio signal 140 from device 105. Converter 115 may include a processor 130, a memory 135, and an interface 137. Processor 130 may be communicatively coupled to memory 135 and to interface 137. This disclosure contemplates processor 130, memory 135, and/or interface 137 operating to perform any of the functions of converter 115 described herein. In particular embodiments, converter 115 may be embodied in device 105. For example, converter 115 may include software operable when executed by device 105 to perform audio authentication.

Memory 135 may store, either permanently or temporarily, data, operational software, or other information for processor 130, such as for example conversion rule 136. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein.

Processor 130 may execute software stored on memory 135 to perform any of the functions described herein. Processor 130 may control the operation and administration of converter 115. Processor 130 may include any hardware and/or software that operates to control and process information. Processor 130 may be a programmable logic device, a microcontroller, a microprocessor, any suitable processing device, or any suitable combination of the preceding.

Interface 137 represents any suitable device operable to receive information from the network, transmit information through the network, perform processing of information, communicate with other devices, or any combination of the preceding. For example, interface 137 may receive audio signal 140 from device 105. As another example, interface 137 may communicate access decision 155 to device 105. Network interface 137 represents any port or connection, real or virtual, including any suitable hardware and/or software, including protocol conversion and data processing capabilities, to communicate through a LAN, WAN, or other communication system that allows converter 115 to exchange information with device 105, the network, or other components of system 100.

Converter 115 may receive audio signal 140 from device 105. Audio signal 140 may be generated when device 105 plays audio file 125. Audio signal 140 may be an audible signal and/or an analog or digital signal. If audio file 125 is a song, then audio signal 140 may include the various frequencies and/or amplitudes associated with playing the song. In particular embodiments, device 105 may communicate audio signal 140 to converter 115 without generating an audible signal. In this manner, the audio signal 140 may not be recorded by another device. Converter 115 may use audio signal 140 to authenticate a user.

Converter 115 may retrieve a file 145 stored in database 120. In particular embodiments, converter 115 may select file 145 based on user account information associated with the user, such as for example, a username. File 145 may include information used by converter 115 to perform audio authentication. For example, file 145 may indicate a start time, an end time, a key, and/or a password. Converter 115 may use one or more of these components of file 145 to perform audio authentication. File 145 will be described in more detail with respect to FIG. 2.

Converter 115 may use audio signal 140 and file 145 to generate a converted audio signal 150. Converter 115 may clip audio signal 140 based on the start time and the end time indicated by file 145 to generate converted audio signal 150. As a result, converted audio signal 150 may be shorter in duration than audio signal 140. Converter 115 may convert audio signal 140 based on one or more conversion rules 136 and the key indicated by file 145. As a result, converted audio signal 150 may be a different format and/or representation than audio signal 140. For example, converted audio signal 150 may be a hash of audio signal 140. The hash may be performed using the key indicated by file 145.

Converter 115 may generate an access decision 155 based on converted audio signal 150 and file 145. Access decision 155 may indicate whether access has been granted or denied. Converter 115 may compare converted audio signal 150 and the password indicated by file 145 to determine whether access should be granted or denied. If converted audio signal 150 matches the password, access may be granted. If converted audio signal 150 does not match the password, access may be denied. Converter 115 may communicate access decision 155 to facilitate the granting or denial of access. Converted audio signal 150 will be described in more detail with respect to FIG. 3.

Database 120 may store information associated with user accounts. Database 120 may include one or more storage devices operable to perform any of the functions of database 120 described herein. Converter 115 may read and/or write information from and to database 120. For example, converter 115 may retrieve files 145 from database 120 and converter 115 may write files 145 to database 120. This disclosure contemplates database 120 including any appropriate storage device to store information associated with user accounts. In particular embodiments, database 120 may be embodied in converter 115.

In particular embodiments, converter 115 may improve the security of secure and/or sensitive information by performing audio authentication. In other embodiments, converter 115 may reduce the likelihood that a password may be lost, forgotten and/or stolen.

In operation, system 100 may perform audio authentication to determine whether a user may be granted access to secure and/or sensitive information. The user may use device 105 to request access to the information. In response, device 105 may request that the user identify a user account and an audio file 125 used to authenticate the user. The user may identify the user account using an identifier such as for example, a username. The user may then select audio file 125 to perform audio authentication. Audio file 125 will be described in more detail with respect to FIG. 2.

After audio file 125 is selected, device 105 may play audio file 125 to generate an audio signal 140. Audio signal 140 may be an audible signal and/or an analog or digital signal. Device 105 may communicate audio signal 140 to converter 115. Audio signal 140 may include the amplitudes and frequencies associated with audio produced by playing audio file 125.

After converter 115 receives audio signal 140, converter 115 may perform audio authentication. Converter 115 may retrieve a file 145 from database 120. File 145 may be associated with the user account identified by the user. File 145 may include information used by converter 115 to perform audio authentication. For example, file 145 may indicate a start time, an end time, a key and a password associated with the user account. File 145 will be described in more detail with respect to FIG. 2.

Converter 115 may convert audio signal 140 based on one or more conversion rules 136 and information included in file 145. Converter 115 may clip audio signal 140 based on the start time and the end time indicated by file 145. For example, if file 145 indicates a start time of 30 seconds and an end time of 40 seconds, converter 115 may clip audio signal 140 to produce the segment of audio signal 140 between 30 seconds and 40 seconds. Converter 115 may also use conversion rules 136 and the key included in file 145 to convert audio signal 140. For example, conversion rule 136 may indicate that a hash is to be performed and converter 115 may generate a hash of audio signal 140 using the key. In particular embodiments, converter 115 may convert the portion of audio signal 140 produced by clipping audio signal 140. For example, converter 115 may generate the hash using the portion of audio signal 140 between 30 seconds and 40 seconds. By converting audio signal 140, converter 115 may generate converted audio signal 150.

Converter 115 may compare converted audio signal 150 to a password included in file 145 to determine whether access should be granted and/or denied. For example, if converted audio signal 150 matches the password, then access may be granted. However, if converted audio signal 150 does not match the password then access may be denied. Converter 115 may generate and/or communicate an access decision 155 indicating that access should be granted or denied. Based on access decision 155, the user may be granted and/or denied access to the secure and/or sensitive information.

Figure 2:
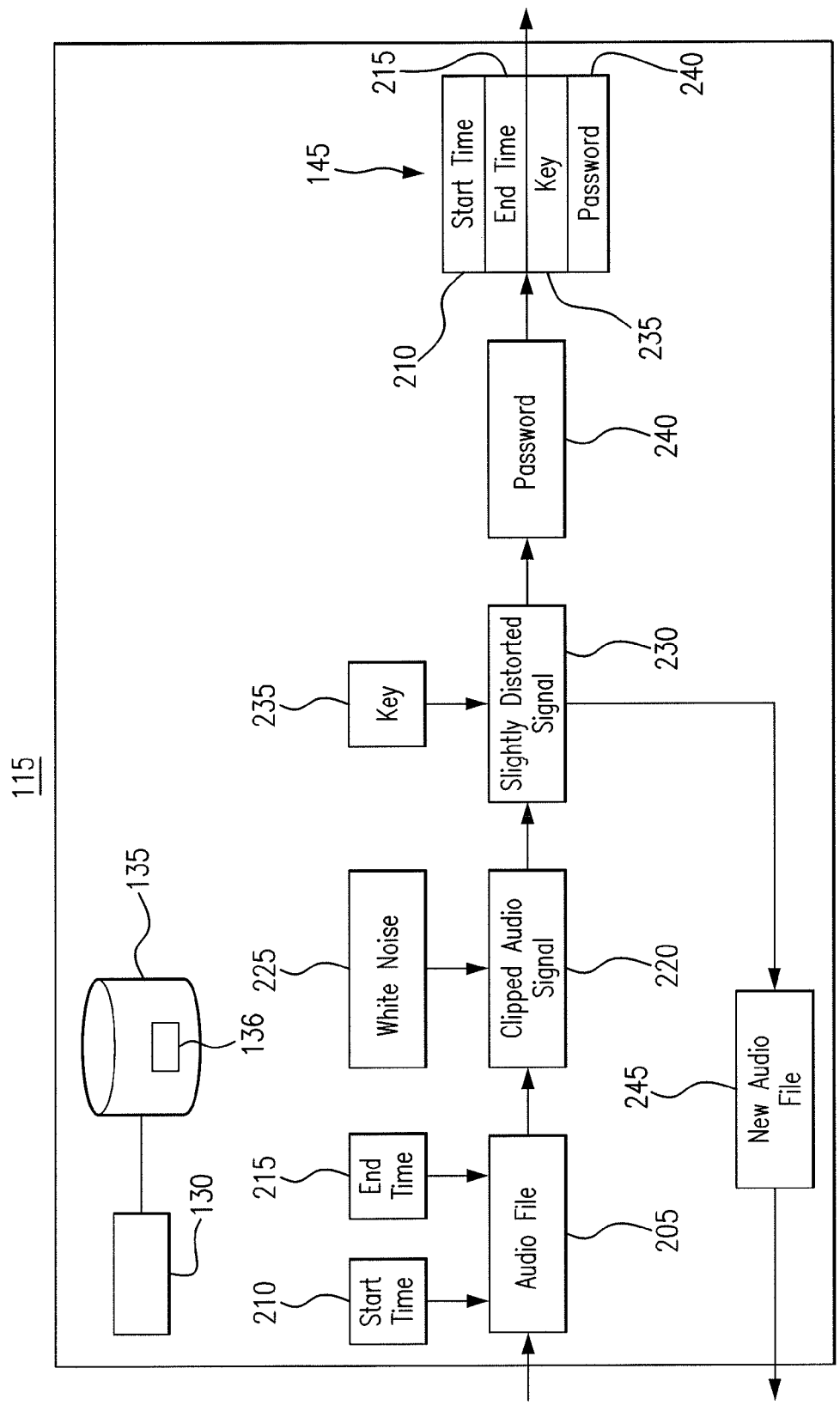
FIG. 2 is a diagram of one embodiment of a converter of the system of FIG. 1.
Figure 3:
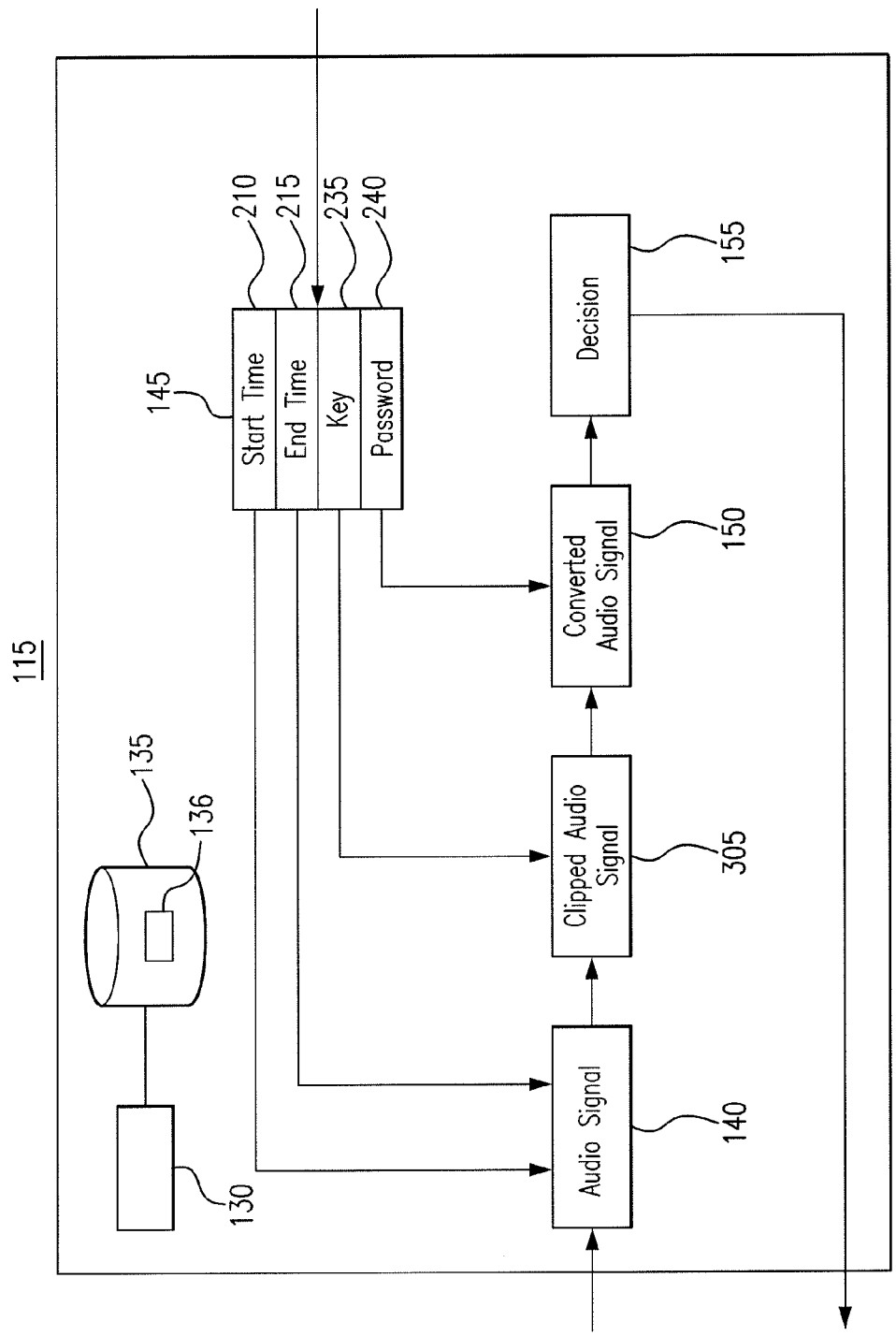
FIG. 3 is a diagram of one embodiment of a converter of the system of FIG. 1.
Figure 4:
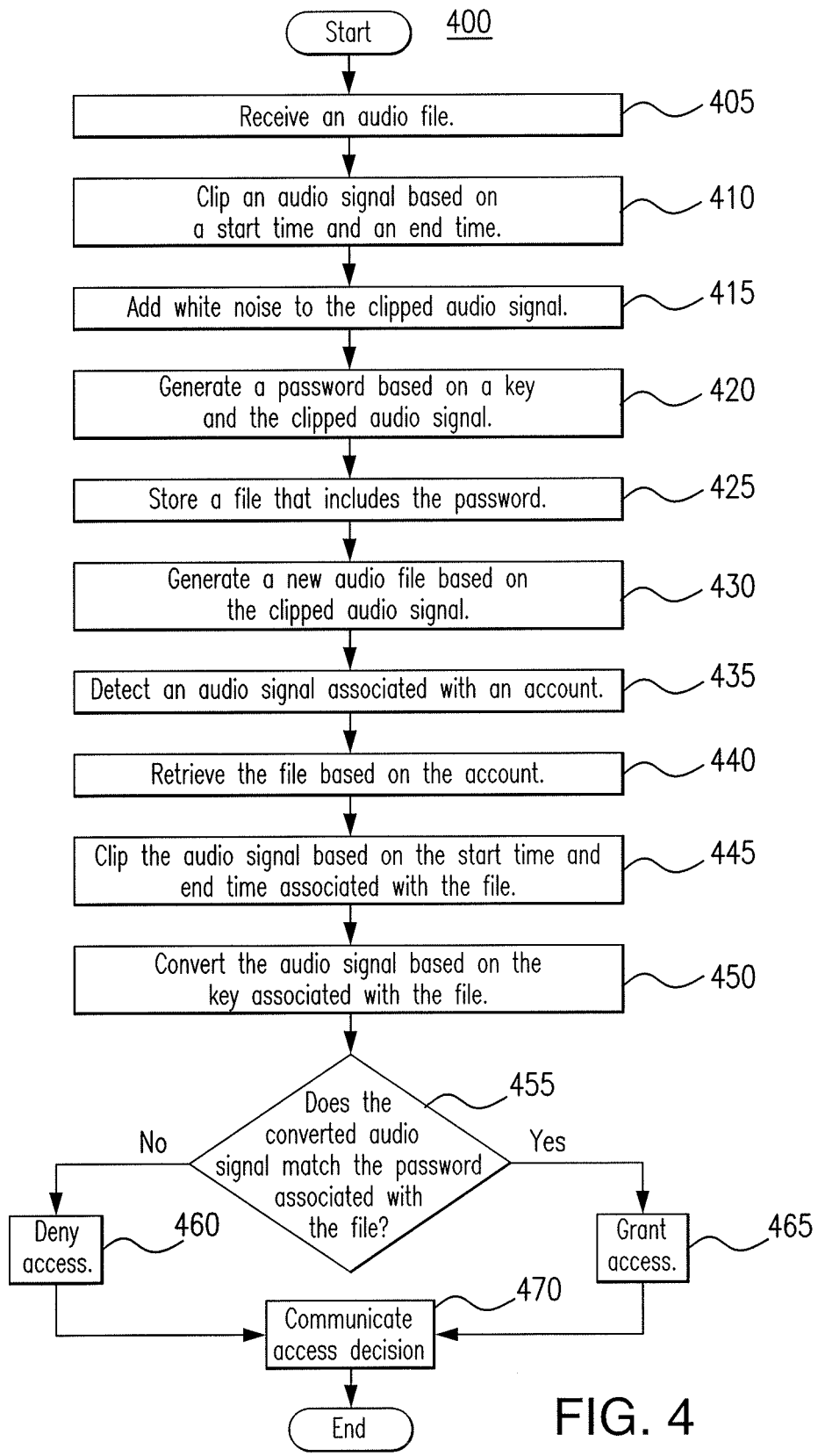
FIG. 4 is a flowchart illustrating a method of performing audio authentication using the system of FIG. 1.

FIGS. 2 through 4 describe audio authentication in more detail. FIG. 2 describes the setup process. FIG. 3 describes the authentication process. FIG. 4 describes a method of performing audio authentication.

FIG. 2 is a diagram of one embodiment of a converter 115 of the system 100 of FIG. 1. As illustrated in FIG. 2, converter 115 may perform a setup process for audio authentication. Initially, a user may request that audio authentication be set up. The user may input user account information, such as for example, a username. The user may also select an audio file 205. Audio file 205 may be stored on device 105 along with other audio files. By selecting audio file 205 from several other audio files, system 100 may improve security by making it more difficult to determine which one of the audio files is the correct audio file 205.

Converter 115 may receive the user name and audio file 205. Audio file 205 may be communicated by device 105 of system 100. In particular embodiments, the user of device 105 may indicate that audio authentication should be set up. As part of the setup process, the user may select audio file 205 stored on device 105. For example, audio file 205 may be a song that the user listens to. Audio file 205 may produce an audio signal. For example, when the song is played, an audio signal may be produced.

After converter 115 receives audio file 205, converter 115 may generate a start time 210 and an end time 215. Converter 115 may then clip the audio signal associated with audio file 205 based on start time 210 and end time 215. For example, if start time 210 is 3.5 seconds and end time 215 is 13.5 seconds, converter 115 may clip the audio signal associated with audio file 205 so that the portion of the audio signal between 3.5 seconds and 13.5 seconds is preserved. Converter 115 may then generate a clipped audio signal 220 using this portion of the audio signal. In particular embodiments, start time 210 and end time 215 may be randomly generated. By clipping the audio signal, converter 115 may improve security by making only a portion of the audio signal applicable to the audio authentication process.

Converter 115 may then add white noise 225 to clipped audio signal 220 to produce slightly distorted signal 230. By adding white noise 225, clipped audio signal may be distorted. In particular embodiments, converter 115 may add white noise 225 to clipped audio signal 220 in such a manner so that the distortions may not be detectable by the human ear. For example, white noise 225 lasting from 1 to 100 microseconds may distort clipped audio signal 220, but the distortion may not be sufficient for a listener to detect a difference between slightly distorted signal 230 and clipped audio signal 220. In particular embodiments, converter 115 may add silence to clipped audio signal 220. Converter 115 may add silence in such a manner so that the distortions may not be detectable by the human ear. For example, silence lasting from 1 to 100 microseconds may not be detectable. In particular embodiments, start time 210 and/or end time 215 may be adjusted to account for the addition of white noise 225 and/or silence.

Converter 115 may generate a key 235 that may be used to convert, based on conversion rule 136, slightly distorted signal 230 into a password 240. In particular embodiments, converter 115 may generate a hash of slightly distorted signal 230 using key 235. The hash signal may be password 240. In particular embodiments, by generating a hash of slightly distorted signal 230 to form password 240, the security of audio authentication may be improved. Because password 240 is a hash of slightly distorted signal 230, it may be more difficult for slightly distorted signal 230 to be recreated from password 240. In this manner, security may be maintained even if password 240 and/or key 235 is stolen.

Converter 115 may include start time 210, end time 215, key 235, and password 240 in a file 145. File 145 may be stored in database 120 for later use during audio authentication. File 145 may further be associated with the user account of the user so that file 145 may be retrieved when the user attempts audio authentication.

Converter 115 may add slightly distorted signal 230 into audio file 205 to produce new audio file 245. Converter 115 may replace the portion of audio file 205 associated with clipped audio signal 220 with slightly distorted signal 230. In this manner, new audio file 245 and audio file 205 may differ only in the presence of white noise 225 and/or silence. Converter 115 may then communicate new audio file 245 to device 105. The user may then replace audio file 205 on device 105 with new audio file 245. In this manner, when the user uses device 105 to perform audio authentication, new audio file 245 effectively becomes the user's password. This process is further described in FIG. 3.

This process may be invoked when a user indicates that the password 240 should be changed. For example, the user may indicate on device 105 that password 240 should be changed. Then, the user may select a different audio file 205 to communicate to converter 115. Converter 115 may then receive and process the different audio file 205 to generate a new password 240.

In particular embodiments, by distorting clipped audio signal 220 and by generating new audio file 245, converter 115 may improve the security of audio authentication. Because new audio file 245 includes slightly distorted signal 230, one cannot authenticate as the user by simply downloading another copy of audio file 205. Furthermore, because new audio file 245 may be stored amongst other audio files on device 105, it may be difficult to determine which of the audio files is used for authentication.

FIG. 3 is a diagram of one embodiment of a converter 115 of the system 100 of FIG. 1. As illustrated in FIG. 3, converter 115 may perform audio authentication. A user may perform audio authentication in order to gain access to secure and/or sensitive information. As part of that process, the user may use device 105 to communicate a username and an audio signal 140 to converter 115. Device 105 may communicate audio signal 140 when the user selects an audio file and when device 105 plays the selected audio file.

Converter 115 may receive audio signal 140. Audio signal 140 may be generated when the user selects audio file 245 and when device 105 plays new audio file 245. When new audio file 245 is played, audio signal 140 is generated and/or communicated to converter 115. Converter 115 may retrieve file 145 from database 120 after receiving audio signal 140. In particular embodiments, converter 115 may retrieve file 145 based on the username associated with the user account. File 145 may include a start time 210, end time 215, key 235 and password 240.

Converter 115 may use start time 210 and end time 215 to clip audio signal 140 to produce clipped audio signal 305. Start time 210 and end time 215 may be the same start time 215 and end time 215 used to generate file 145. In this manner, clipped audio signal 305 and clipped audio signal 220 may be from corresponding portions of new audio file 245 and audio file 205, respectively. The only difference between clipped audio signal 305 and clipped audio signal 220 may be that clipped audio signal 305 includes white noise 225 and/or silence.

Converter 115 may use key 235 to convert, based on conversion rule 136, clipped audio signal 305 to produce converted audio signal 150. In particular embodiments, converter 115 may generate a hash of clipped audio signal 305 using key 235. The hashed signal may be converted audio signal 150. Converter 115 may compare converted audio signal 150 to password 240 to determine whether access should be granted or denied. If converted audio signal 150 matches password 240, access may be granted. If converted audio signal 150 does not match password 240, access may be denied. Converter 115 may generate an access decision 155 that indicates whether access should be granted or denied. Converter 115 may then communicate access decision 155 to facilitate the grant or denial of access.

The following example helps illustrate the processes described in FIGS. 2 and 3. A user may desire to protect sensitive information using audio authentication. The user may indicate using a device 105, such as the user's mobile phone, that audio authentication should be set up. The user may input a username associated with the user's account. The user may then select an audio file 205, such as a song, stored on the mobile phone. The user may have many songs stored on the mobile phone. After the user selects the song, the mobile phone may communicate the song to converter 115.

Converter 115 may receive the song and generate a random start time 210 of 5 seconds and a random end time 215 of 16 seconds. Converter 115 may then clip the song from 5 seconds to 16 seconds to produce a clipped audio signal 220. Converter 115 may then add white noise 225 to the 11-second clipped audio signal 220 to produce a slightly distorted signal 230. Converter 115 may add 1 microsecond of white noise 225 to clipped audio signal 220 so that the white noise 225 is undetectable by the human ear. After converter 115 adds white noise 225, converter 115 may generate a key 235. Converter 115 may then use key 235 to hash slightly distorted signal 230 to produce a password 240. Converter 115 may then include in a file 145 fields indicating 5 seconds (start time), 16 seconds (end time), key 235, and password 240. Converter 115 may then store file 145 in a database 120.

Converter 115 may then create new audio file 245 by replacing the clipped portion of audio file 205 between 5 seconds and 16 seconds with slightly distorted signal 230. Converter 115 may then communicate new audio file 245 to the user's mobile phone. The user may then replace the selected song with new audio file 245. In this manner, it may appear like new audio file 245 is simply another song stored on the mobile phone.

When the user wants to access the sensitive information, the user may request access using the mobile phone. The user may then input the username associated with the user's account. The mobile phone may then request the user supply a password. In response, the user may select new audio file 245. The mobile phone may then play audio file 245 to generate an audio signal 140. Converter 115 may receive audio signal 140. Converter 115 may also retrieve file 145 based on the username.

From file 145, converter 115 may determine that the start time is 5 seconds and the end time is 16 seconds. Converter 115 may then clip audio signal 140 from 5 seconds to 16 seconds. Converter 115 may then hash the 11-second clip, based on conversion rule 136, using the key 235 included in file 145. Converter 115 may then compare the hashed clip with the password 240 included in file 145. Because the user had selected new audio file 245, password 240 and the hashed clip should match. Based on that match, converter 115 may determine that access to the sensitive information should be granted. Had the user selected a song other than new audio file 245, then the hashed clip would not have matched the password 240, and access would have been denied.

This disclosure contemplates a similar process for authenticating using image file and video files. For example, converter 115 may receive an image file and/or a video file and clip the associated image and/or the associated video based on start time 210 and end time 215. Converter 115 may then add white noise 225 to the clipped image file and/or video file. Converter 115 may then convert the distorted image file and/or video file using key 235, such as for example by hashing the distorted image file and/or video file. Converter 115 may then generate and store file 145 and generate a new image file and/or a new video file.

When the user wants to access the sensitive information, the user may select the new image file and/or the new video file. Converter 115 may then receive the image and/or the video. Converter 115 may retrieve file 145 and clip the image and/or the video based on start time 210 and end time 215. Converter 115 may then convert, based on conversion rule 136, the clipped image and/or video using key 235. Converter 115 may then compare the converted, clipped image and/or video with password 240. If there is a match, access may be granted, otherwise, access may be denied. Converter 115 may then communicate the access decision 155 to facilitate the granting or denial of access. In particular embodiments, by allowing the user to authenticate using images and video, security may be enhanced because it would be more difficult to determine which file (audio, video, or image) stored on device 105 is the correct file with which to authenticate.

FIG. 4 is a flowchart illustrating a method 400 of performing audio authentication using the system 100 of FIG. 1. In particular embodiments, converter 115 may perform method 400. Converter 115 may begin by setting up audio authentication. To begin the setup, converter 115 may receive an audio file in step 405. The audio file may be received from a device associated with a user. The user may have used the device to communicate the audio file in order to set up audio authentication.

Converter 115 may then clip an audio signal associated with the audio file based on a start time and an end time in step 410. Converter 115 may have generated the start time and the end time. The audio signal may be generated by playing the audio file.

In step 415, converter 115 may add white noise to the clipped audio signal. In particular embodiments, the white noise may be added in such a manner so that a human ear may not detect the white noise. For example, converter 115 may add 1 to 100 microseconds of white noise into clipped audio signal. In this manner randomness may be introduced into the clipped audio signal that is not detectable by the user or another user.

In step 420, converter 115 may generate a password based on a key and a clipped audio signal. In certain embodiments, converter 115 may generate the password based further on a stored conversion rule. In particular embodiments, converter 115 may generate a hash of the clipped audio signal using the key. Converter 115 may then store a file that includes the password in step 425. Converter 115 may store the file in a database. The file may further include the start time, the end time, and the key.

Converter 115 may then generate a new audio file based on the clipped audio signal. In particular embodiments, converter 115 may replace the portion of the audio file that was clipped with the clipped audio signal that includes the white noise. In this manner the new audio file may differ from the audio file only in the addition of white noise.

Converter 115 may then perform audio authentication. In step 435, converter 115 may detect an audio signal associated with an account. The audio signal may be generated when the device plays an audio file and/or the new audio file. In step 440, converter 115 may retrieve the file based on the account. The file may indicate the start time, the end time, the key and the password.

In step 445, converter 115 may clip the audio signal based on the start time and end time associated with the file. After clipping the audio signal, converter 115 may convert, based on a conversion rule, the audio signal based on the key associated with the file in step 450. In particular embodiments, converter 115 may generate a hash of the audio signal using the key. In step 455, converter 115 may compare the converted audio signal with the password. Converter 115 may determine whether the converted audio signal matches the password. If the converted audio signal matches the password, converter 115 may proceed to step 465 and grand access. If the converted audio signal does not match the password, converter 115 may proceed to step 460 and deny access. Converter 115 may then conclude by communicating the access decision in step 470.

In particular embodiments, by performing method 400, converter 115 may provide a more secure authentication technique by reducing the probability of an unauthorized user fraudulently accessing an account. In a certain embodiment, converter 115 may provide more reliable authentication by providing an authentication technique that does not degrade and/or change over time.

Although the present disclosure includes several embodiments, changes, substitutions, variations, alterations, transformations, and modifications may be suggested to one skilled in the art, and it is intended that the present disclosure encompass such changes, substitutions, variations, alterations, transformations, and modifications as fall within the spirit and scope of the appended claims.

What is claimed is:

1. An apparatus comprising:
 a memory operable to store a conversion rule;
 an interface operable to:
  receive an audio signal; and
  receive a file, wherein the file indicates:
   a start time;
   an end time;
   a key; and
   a password; and
 a processor communicatively coupled to the memory and the interface and operable to:
  clip the audio signal from the start time to the end time to produce a portion of the audio signal;
  convert, based at least in part upon the conversion rule, the portion of the audio signal using the key to form a converted portion of the audio signal;
  determine that the converted portion of the audio signal matches the password, wherein the interface is further operable to communicate a response indicating that the converted portion of the audio signal matches the password.

2. The apparatus of claim 1, wherein the portion of the audio signal comprises white noise.

3. The apparatus of claim 1, wherein converting the portion of the audio signal comprises generating a hash of the portion of the audio signal.

4. The apparatus of claim 1, wherein:
the processor is further operable to request that the password be changed; and
the interface is further operable to receive an audio file in response to the request that the password be changed.

5. The apparatus of claim 1, wherein:
the interface is further operable to receive at least one of an image file and a video file;
the processor is further operable to:
clip the at least one of an image file and a video file from the start time to the end time to produce a portion of the at least one of an image file and a video file;
convert, based at least in part upon the conversion rule, the portion of the at least one of an image file and a video file using the key to form a converted portion of the at least one of an image file and a video file; and
determine that the converted portion of the at least one of an image file and a video file matches the password; and
the interface is further operable to communicate a second response indicating the determination that the converted portion of the at least one of an image file and a video file matches the password.

6. The apparatus of claim 1, wherein the audio signal is generated by playing an audio file.

7. The apparatus of claim 1, wherein:
the interface is further operable to receive an audio file associated with a second audio signal; and
the processor is further operable to:
determine a second start time and a second end time;
clip the second audio signal between the second start time and the second time to form a portion of the second audio signal;
add white noise to the portion of the second audio signal to form a third audio signal;
generate a second key;
convert the audio signal based on the second key to form a second password; and
generate a second file comprising:
the second start time;
the second end time;
the second key; and
the second password.

8. A method comprising:
storing, by a memory, a conversion rule;
receiving, by an interface, an audio signal;
receiving, by the interface, a file, wherein the file indicates:
a start time;
an end time;
a key; and
a password;
clipping, by a processor communicatively coupled to the memory and to the interface, the audio signal from the start time to the end time to produce a portion of the audio signal;
converting, by the processor, based at least in part upon the conversion rule, the portion of the audio signal using the key to form a converted portion of the audio signal;
determining, by the processor, that the converted portion of the audio signal matches the password; and
communicating, by the interface, a response indicating that the converted portion of the audio signal matches the password.

9. The method of claim 8, wherein the portion of the audio signal comprises white noise.

10. The method of claim 8, wherein converting the portion of the audio signal comprises generating a hash of the portion of the audio signal.

11. The method of claim 8, further comprising:
requesting, by the processor, that the password be changed; and
receiving, by the interface, an audio file in response to the request that the password be changed.

12. The method of claim 8, further comprising:
receiving, by the interface, at least one of an image file and a video file;
clipping, by the processor, the at least one of an image file and a video file from the start time to the end time to produce a portion of the at least one of an image file and a video file;
converting, by the processor, based at least in part upon the conversion rule, the portion of the at least one of an image file and a video file using the key to form a converted portion of the at least one of an image file and a video file;
determining, by the processor, that the converted portion of the at least one of an image file and a video file matches the password; and
communicating, by the interface, a second response indicating the determination that the converted portion of the at least one of an image file and a video file matches the password.

13. The method of claim 8, wherein the audio signal is generated by playing an audio file.

14. The method of claim 8, further comprising:
receiving, by the interface, an audio file associated with a second audio signal;
determining, by the processor, a second start time and a second end time;
clipping, by the processor, the second audio signal between the second start time and the second time to form a portion of the second audio signal;
adding, by the processor, white noise to the portion of the second audio signal to form a third audio signal;
generating, by the processor, a second key;
converting, by the processor, based at least in part upon the conversion rule, the audio signal based on the second key to form a second password; and
generating, by the processor, a second file comprising:
the second start time;
the second end time;
the second key; and
the second password.

15. One or more computer-readable non-transitory storage media embodying software that is operable when executed to:
store, by a memory, a conversion rule;
receive, by an interface, an audio signal;
receive, by the interface, a file, wherein the file indicates:
a start time;
an end time;
a key; and
a password;
clip, by a processor communicatively coupled to the memory and to the interface, the audio signal from the start time to the end time to produce a portion of the audio signal;

convert, by the processor, based at least in part upon the conversion rule, the portion of the audio signal using the key to form a converted portion of the audio signal;

determine, by the processor, that the converted portion of the audio signal matches the password; and communicate, by the interface, a response indicating that the converted portion of the audio signal matches the password.

16. The media of claim 15, wherein the portion of the audio signal comprises white noise.

17. The media of claim 15, wherein converting the portion of the audio signal comprises generating a hash of the portion of the audio signal.

18. The media of claim 15, further embodying software that is operable when executed to:

request, by the processor, that the password be changed; and receive, by the interface, an audio file in response to the request that the password be changed.

19. The media of claim 15, further embodying software that is operable when executed to:

receive, by the interface, at least one of an image file and a video file;

clip, by the processor, the at least one of an image file and a video file from the start time to the end time to produce a portion of the at least one of an image file and a video file;

convert, by the processor, based at least in part upon the conversion rule, the portion of the at least one of an image file and a video file using the key to form a converted portion of the at least one of an image file and a video file;

determine, by the processor, that the converted portion of the at least one of an image file and a video file matches the password; and communicate, by the interface, a second response indicating the determination that the converted portion of the at least one of an image file and a video file matches the password.

20. The media of claim 15, wherein the audio signal is generated by playing an audio file.

21. The media of claim 15, further comprising:

receive, by the interface, an audio file associated with a second audio signal;

determine, by the processor, a second start time and a second end time;

clip, by the processor, the second audio signal between the second start time and the second time to form a portion of the second audio signal;

add, by the processor, white noise to the portion of the second audio signal to form a third audio signal;

generate, by the processor, a second key;

convert, by the processor, based at least in part upon the conversion rule, the audio signal based on the second key to form a second password; and generate, by the processor, a second file comprising:
the second start time;
the second end time;
the second key; and
the second password.

* * * * *